US011754032B2

(12) United States Patent
Imanaka et al.

(10) Patent No.: US 11,754,032 B2
(45) Date of Patent: Sep. 12, 2023

(54) IGNITION SYSTEM

(71) Applicant: DENSO CORPORATION, Kariya (JP)

(72) Inventors: Yasuomi Imanaka, Kariya (JP); Ryo Tamura, Kariya (JP); Yuji Kaji, Kariya (JP); Atsushi Iwami, Kariya (JP); Tatsuya Oka, Kariya (JP); Yuuta Kawashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/874,671

(22) Filed: Jul. 27, 2022

(65) Prior Publication Data

US 2022/0364538 A1 Nov. 17, 2022

Related U.S. Application Data

(63) Continuation of application No. PCT/JP2021/001282, filed on Jan. 15, 2021.

(30) Foreign Application Priority Data

Jan. 29, 2020 (JP) .................................. 2020-012918
Apr. 3, 2020 (JP) .................................. 2020-067668

(51) Int. Cl.
*F02P 5/15* (2006.01)
*F02P 9/00* (2006.01)

(52) U.S. Cl.
CPC .................. *F02P 5/15* (2013.01); *F02P 9/002* (2013.01)

(58) Field of Classification Search
CPC .... F02P 5/15; F02P 9/002; F02P 13/00; F02B 19/12; H01T 13/54; Y02T 10/12

USPC ................ 123/260, 266, 287, 169 el, 169 ea
See application file for complete search history.

(56) References Cited

U.S. PATENT DOCUMENTS

| 4,930,473 A * | 6/1990 | Dietrich .................. F02B 19/12 123/169 EL |
| 7,659,655 B2 * | 2/2010 | Tozzi ...................... F02B 19/12 123/285 |
| 8,584,648 B2 * | 11/2013 | Chiera .................... H01T 21/02 123/266 |
| 8,839,762 B1 * | 9/2014 | Chiera .................... F02B 19/12 123/266 |

(Continued)

FOREIGN PATENT DOCUMENTS

| JP | 2009-270541 | 11/2009 |
| JP | 2010-261407 | 11/2010 |

(Continued)

*Primary Examiner* — Hai H Huynh
(74) *Attorney, Agent, or Firm* — Nixon & Vanderhye P.C.

(57) ABSTRACT

An ignition system has an ignition plug and an ignition control unit that controls the ignition plug. When an engine is in a predetermined operating state, the ignition control unit performs ignition control after top dead center to perform ignition after the compression top dead center. The ignition system has an airflow support structure that facilitates the flow of airflow through a discharge gap at least after the compression top dead center. The ignition system is configured such that due to the airflow support structure and the timing of the ignition, airflow at a flow rate of 5 m/s or more flows through the discharge gap during a spark period after top dead center, which is the generation period of the discharge spark in the ignition control after top dead center.

24 Claims, 5 Drawing Sheets

(56) References Cited

U.S. PATENT DOCUMENTS

| | | | |
|---|---|---|---|
| 9,004,042 B2* | 4/2015 | Tozzi | F02B 19/12 |
| | | | 123/297 |
| 10,024,220 B2* | 7/2018 | Sotiropoulou | F02B 19/12 |
| 2003/0074890 A1 | 4/2003 | Yamashita et al. | |
| 2014/0261298 A1 | 9/2014 | Sasidharan et al. | |
| 2016/0053673 A1 | 2/2016 | Sotiropoulou et al. | |
| 2016/0053733 A1 | 2/2016 | Aochi et al. | |
| 2020/0014175 A1 | 1/2020 | Gozawa | |

FOREIGN PATENT DOCUMENTS

| JP | 2018076823 A | 5/2018 |
|---|---|---|
| JP | 2020159355 A | 10/2020 |

* cited by examiner

IGNITION SYSTEM

CROSS-REFERENCE TO RELATED APPLICATION

This application is a continuation application of International Application No. PCT/JP2021/001282 filed Jan. 15, 2021 which designated the U.S. and claims priority to Japanese Patent Application No. 2020-012918 filed with the Japan Patent Office on Jan. 29, 2020, and Japanese Patent Application No. 2020-067668 filed with the Japan Patent Office on Apr. 3, 2020, the entire contents of each of which are incorporated herein by reference.

BACKGROUND

Technical Field

The present disclosure relates to an ignition system that ignites fuel in the combustion chamber of an engine.

Related Art

Ignition systems generally have ignition plugs. Many ignition plugs have a center electrode and a ground electrode opposing the center electrode. The ground electrode has a standing portion extending along the length direction of the ignition plug, and an opposing portion extending inward from the tip of the standing portion and opposing the center electrode. A voltage is applied to the discharge gap between the center electrode and the opposing portion to generate a discharge spark, thereby igniting fuel in the combustion chamber.

DESCRIPTION OF SPECIFIC EMBODIMENTS

Figure 1:
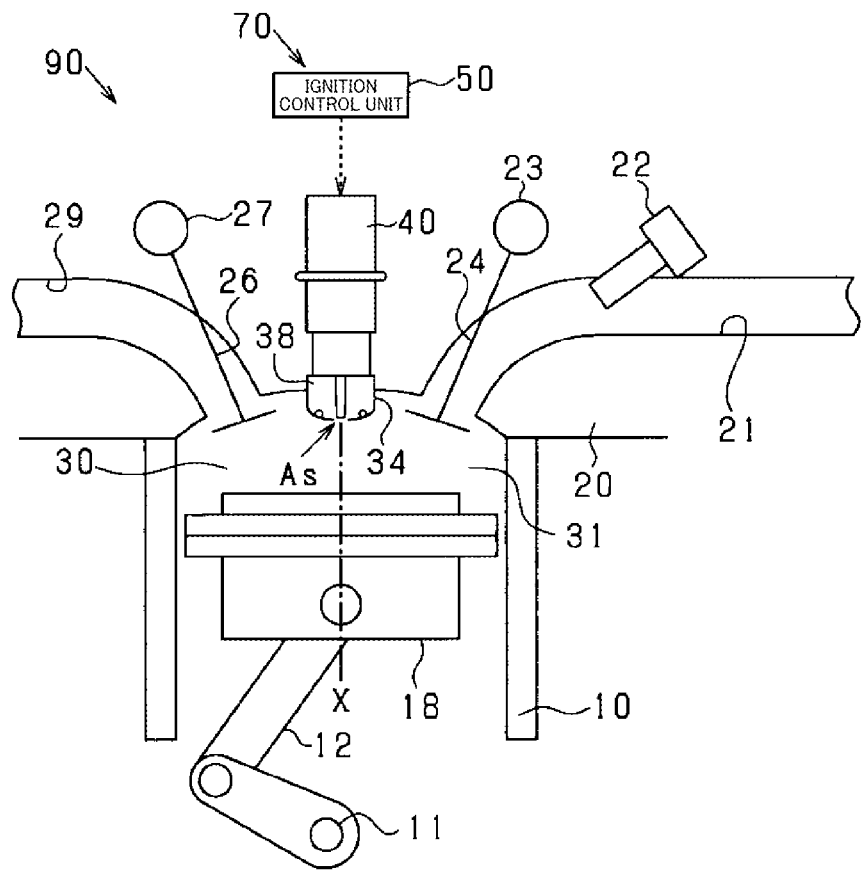
FIG. 1 is a schematic diagram illustrating an ignition system of a first embodiment and its surroundings.

The ignition will be described in more detail below. Airflow due to tumble or swirl generated in the combustion chamber flows through the discharge gap. Due to the airflow, the discharge spark is extended downwind to improve ignitability. However, depending on the mode of tumble or swirl, the discharge gap may be positioned just downwind of the standing portion of the ground electrode. In that case, the standing portion disturbs the airflow, so that the airflow flowing through the discharge gap is reduced. As a result, the extension of the discharge spark becomes small, and ignitability due to the discharge spark decreases. Therefore, as disclosed in JP 5919214 B, an airflow guide protrusion for guiding airflow to the discharge gap is provided next to the standing portion of the ground electrode.

According to the above technique, even if the discharge gap is positioned just downwind of the standing portion of the ground electrode, airflow due to tumble or swirl can be guided to the discharge gap by the airflow guide protrusion before the compression top dead center to increase the airflow flowing through the discharge gap. Therefore, when ignition is performed before the compression top dead center, the discharge spark can be extended to improve ignitability.

However, for example, when the engine is in a predetermined operating condition, such as during fast idling for warming-up the catalyst, ignition may be performed after the compression top dead center instead of before the compression top dead center. In that case, when the piston passes the compression top dead center, the tumble or swirl itself once collapses in many cases. Accordingly, it is difficult to guide the airflow due to tumble or swirl to the discharge gap by the airflow guide protrusion after the compression top dead center. Therefore, when ignition with a discharge spark is performed after the compression top dead center, it is difficult to improve ignitability due to the discharge spark.

In view of the foregoing, it is desired to have a technique for improving ignitability due to a discharge spark when ignition with the discharge spark is performed after the compression top dead center.

The ignition system of the present disclosure has an ignition plug that applies a voltage to a discharge gap to generate a discharge spark to ignite fuel in the combustion chamber of an engine, and an ignition control unit that controls the ignition plug. When the engine is in a predetermined operating state, the ignition control unit performs ignition control after top dead center to perform the ignition after the compression top dead center.

The ignition system has an airflow support structure that facilitates the flow of airflow through the discharge gap at least after the compression top dead center. The ignition system is configured such that due to the airflow support structure and the timing of the ignition, airflow at a flow rate of 5 m/s or more flows through the discharge gap during a spark period after top dead center, which is the generation period of the discharge spark in the ignition control after top dead center.

Since the present disclosure is configured such that due to the airflow support structure and the ignition timing, airflow at a flow rate of 5 m/s or more flows through the discharge gap during the spark period after top dead center, the airflow can extend the discharge spark to improve ignitability. Therefore, when ignition with a discharge spark is performed after the compression top dead center, ignitability due to the discharge spark can be improved.

Next, embodiments of the present disclosure will be described with reference to the drawings. However, the present disclosure is not limited to the embodiments and can be implemented with modifications, as appropriate, without departing from the gist of the disclosure.

First Embodiment

FIG. 1 is a cross-sectional view illustrating an ignition system 70 of a first embodiment and its surroundings. The ignition system 70 is disposed in an engine 90. The engine 90 is a four-stroke engine with one combustion cycle consisting of four strokes: intake stroke→compression stroke-→expansion stroke→exhaust stroke. Hereinafter, the top dead center between the compression stroke and the expansion stroke among these strokes is referred to as "the compression top dead center Td." The engine 90 has a cylinder 10 and a head 20 attached to the upper portion of the cylinder.

In the following, the length direction of the center line X of the cylinder 10 will be described as the vertical direction in accordance with the drawing. However, for example, the engine 90 and the ignition system 70 may be disposed while making the center line X at an angle to the vertical direction, or the engine 90 and the ignition system 70 may be disposed with the center line X horizontal. Thus, the engine 90 and the ignition system 70 can be disposed in any direction.

In the cylinder 10, a piston 18 is provided. The piston 18 is connected to a crankshaft 11 through a link 12, and moves up and down in accordance with the rotation of the crankshaft 11. A combustion chamber 30 is formed above the piston 18.

The head 20 is provided with an intake pathway 21 for introducing gas into the combustion chamber 30, and an exhaust pathway 29 for exhausting gas from the combustion chamber 30. The intake pathway 21 is provided with an intake valve 24, and the exhaust pathway 29 is provided with an exhaust valve 26. The intake valve 24 is driven by an intake cam 23, and the exhaust valve 26 is driven by an exhaust cam 27. The head 20 is provided with a fuel injector 22 for injecting fuel into the intake pathway 21.

The ignition system 70 has an ignition plug 40 attached to the head 20, an ignition control unit 50 that controls the ignition plug 40, and an airflow support structure As that facilitates the flow of airflow through a discharge gap 45 of the ignition plug 40.

The ignition control unit 50 is an electronic control unit (ECU) or the like, and changes the ignition timing depending on the operating state of the engine 90, such as the rotational speed and load of the engine 90. Moreover, the ignition control unit 50 performs ignition control after top dead center to perform ignition after the compression top dead center Ta (i.e., expansion stroke), when the engine 90 is in a predetermined operating state, for example, during fast idling. On the other hand, when the engine 90 is in an operating state other than the above state, the ignition control unit 50 performs ignition control before top dead center to perform ignition before the compression top dead center Tb (i.e., compression stroke). The phrase "during fast idling" mentioned above refers to a period of time in which the idling rotational speed is higher than normal to warm-up the catalyst etc. after the engine 90 starts.

Figure 2:
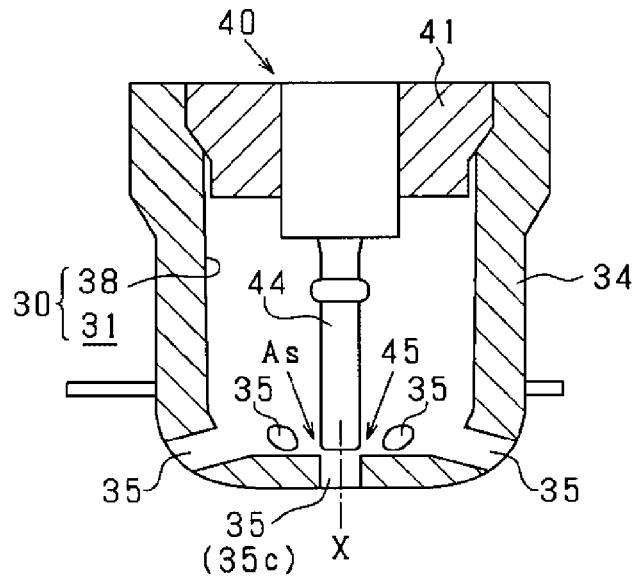
FIG. 2 is a cross-sectional view illustrating an auxiliary chamber and its surroundings.

FIG. 2 is a cross-sectional view illustrating an auxiliary chamber 38 and its surroundings. The ignition plug 40 has a center electrode 44 and an insulator 41 provided on the outer peripheral side of the center electrode. A partition wall 34 is provided around the lower end part of the insulator 41 so as to surround the lower end part of the center electrode 44 from below and from the side. The partition wall 34 divides the combustion chamber 30 into a main chamber 31 and the auxiliary chamber 38. Specifically, the inner side of the partition wall 34 constitutes the auxiliary chamber 38, and the outer side of the partition wall 34 constitutes the main chamber 31. The partition wall 34 is made of a conductive material, and also serves as the ground electrode of the ignition plug 40.

The partition wall 34 is provided with a plurality of communication holes 35, and these communication holes 35 connect the auxiliary chamber 38 and the main chamber 31. A central communication hole 35c, which is one of these communication holes 35, is provided on the center line X of the cylinder 10, and vertically penetrates the partition wall 34. The lower end part of the center electrode 44 is positioned right above the central communication hole 35c. That is, the lower part of the center electrode 44 extends long downward from the lower end of the insulator 41, and the lower end part of the center electrode 44 is close to the central communication hole 35c. The gap between the lower end part of the center electrode 44 and the upper end peripheral part of the central communication hole 35c in the partition wall 34 constitutes a discharge gap 45. Accordingly, the discharge gap 45 is provided in the immediate vicinity of the central communication hole 35c in the auxiliary chamber 38. Therefore, the discharge gap 45 is closest to the central communication hole 35c among the plurality of communication holes 35. The ignition plug 40 applies a voltage to the discharge gap 45 to generate a discharge spark F, thereby igniting fuel in the combustion chamber 30.

Since the discharge gap 45 is thus close to the central communication hole 35c, airflow easily flows through the discharge gap 45. This structure constitutes the airflow support structure As. That is, a structure in which the discharge gap 45 is close to the central communication hole 35c is formed as the airflow support structure As.

Figure 3:
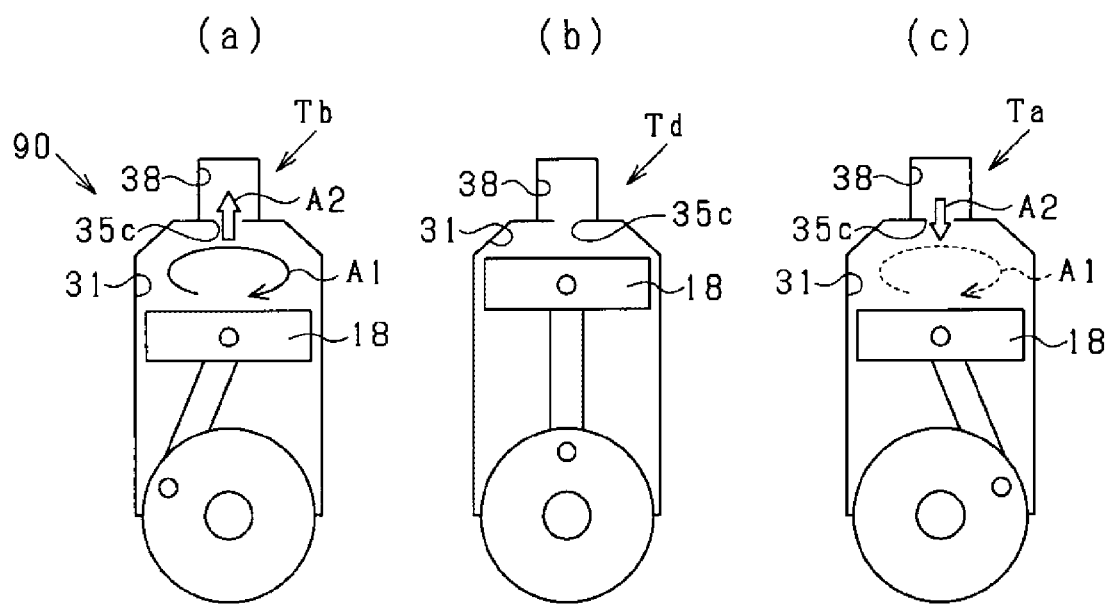
FIG. 3 shows schematic diagrams illustrating the state of airflow before and after the compression top dead center.

FIG. 3 shows schematic diagrams illustrating the state of airflow before and after the compression top dead center Td. Hereinafter, airflow due to tumble or swirl is referred to as "general airflow A1," and airflow flowing through the central communication hole 35c is referred to as "communication airflow A2."

As shown in FIG. 3(a), before the compression top dead center Tb (compression stroke), the piston 18 ascends. At this time, in addition to the general airflow A1, the communication airflow A2 flowing from the main chamber 31 side to the auxiliary chamber 38 side is generated in the combustion chamber 30.

As shown in FIG. 3(b), at the compression top dead center Td, the movement of the piston 18 stops for a moment because it changes from ascending to descending. At this time, the general airflow A1 collapses or weakens extremely, and the communication airflow A2 stops in the combustion chamber 30.

As shown in FIG. 3(c), after the compression top dead center Ta (expansion stroke), the piston 18 descends. At this time, the communication airflow A2 flowing from the auxiliary chamber 38 side to the main chamber 31 side is generated in the combustion chamber 30. Further, the general airflow A1 is generated in a delayed manner.

Figure 4:
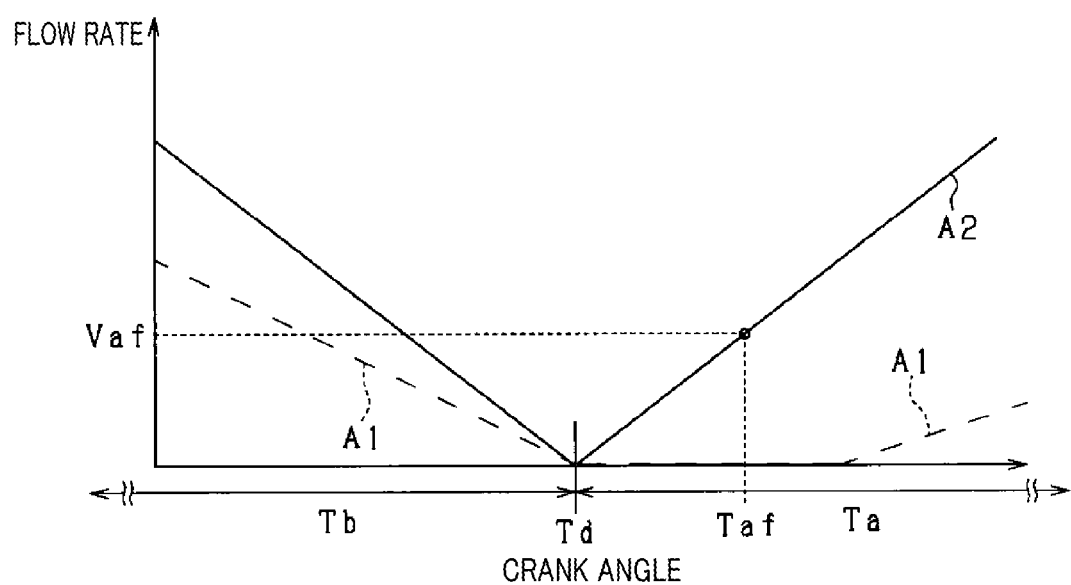
FIG. 4 is a graph illustrating changes in the flow rates of airflows before and after the compression top dead center.

FIG. 4 is a graph illustrating an image of changes in the flow rates (absolute values) of the general airflow A1 and the communication airflow A2 shown above. The flow rate of the general airflow A1 decreases as it comes closer to the compression top dead center Td before the compression top dead center Tb. Then, the general airflow A1 collapses or weakens extremely at or around the compression top dead center Td. Then, after the compression top dead center Ta, the general airflow A1 is regenerated after some time has passed since the compression top dead center Td. This is because the general airflow A1 due to tumble or swirl is not generated until there is a predetermined trigger, even when the piston 18 starts to descend and the air pressure in the main chamber 31 starts to decrease.

On the other hand, the flow rate of the communication airflow A2 decreases as it comes closer to the compression top dead center Td before the compression top dead center Tb. Then, the communication airflow A2 becomes zero once at or around the compression top dead center Td. However, the communication airflow A2 is regenerated quickly after the compression top dead center Ta. This is because the communication airflow A2 is generated when the piston 18 starts to descent and a pressure difference starts to occur between the auxiliary chamber 38 and the main chamber 31.

As described above, after the compression top dead center Ta, the general airflow A1 is not immediately generated, whereas the communication airflow A2 is quickly generated. Accordingly, in the present embodiment, at the time of ignition control after top dead center, airflow is enabled to flow through the discharge gap 45 by actively utilizing the communication airflow A2 rather than the general airflow A1. This is the airflow support structure As mentioned above. At a timing Taf at which airflow at a flow rate Vaf of 10 to 240 m/s flows through the discharge gap 45 by the airflow support structure As, ignition is performed by the ignition plug 40.

Figure 5:
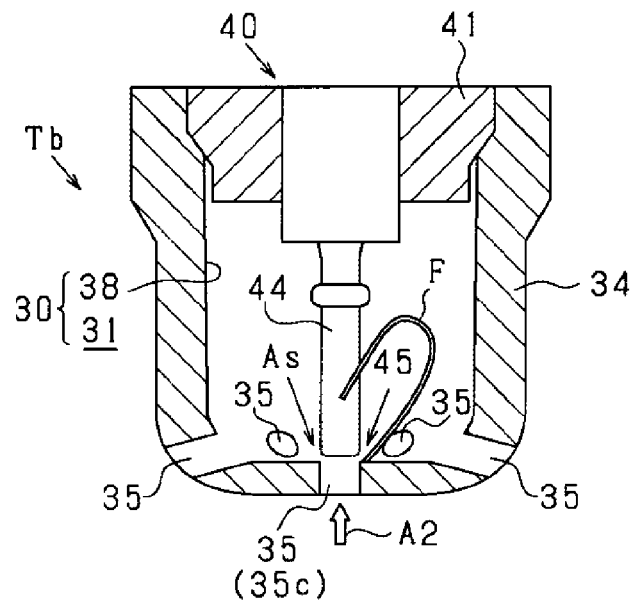
FIG. 5 is a cross-sectional view illustrating an auxiliary chamber and its surroundings at the time of ignition control before top dead center.

Hereinafter, the generation period of the discharge spark F in the ignition control after top dead center is referred to as the "spark period after top dead center." As described above, the ignition system 70 is configured such that due to the airflow support structure As and the ignition timing Tf, airflow at a flow rate Vaf of 10 to 240 m/s flows through the discharge gap 45 during the spark period after top dead center. In other words, a structure in which the discharge gap 45 is close to the central communication hole 35c such that airflow at a flow rate of 5 m/s or more flows through the discharge gap 45 during the spark period after top dead center is formed as the airflow support structure As. FIG. 5 is a cross-sectional view illustrating the auxiliary chamber 38 and its surroundings at the time of ignition control before top dead center in normal times or the like. At the time of ignition control before top dead center, upward communication airflow A2 flowing from the main chamber 31 side to the auxiliary chamber 38 side flows through the discharge gap 45. Due to the communication airflow A2, the discharge spark F is extended upward in the auxiliary chamber 38. Due to the discharge spark F, the ignition plug 40 ignites fuel in the auxiliary chamber 38. As a result, the flame generated in the auxiliary chamber 38 is emitted from each communication hole 35 toward the inside of the main chamber 31. However, flame emission from the central communication hole 35c is smaller than that from the other communication holes 35 because the discharge gap 45 is close thereto, and flame emission is disturbed by the center electrode 44 etc. Therefore, the flame is mainly emitted from the communication holes 35 other than the central communication hole 35c.

Figure 6:
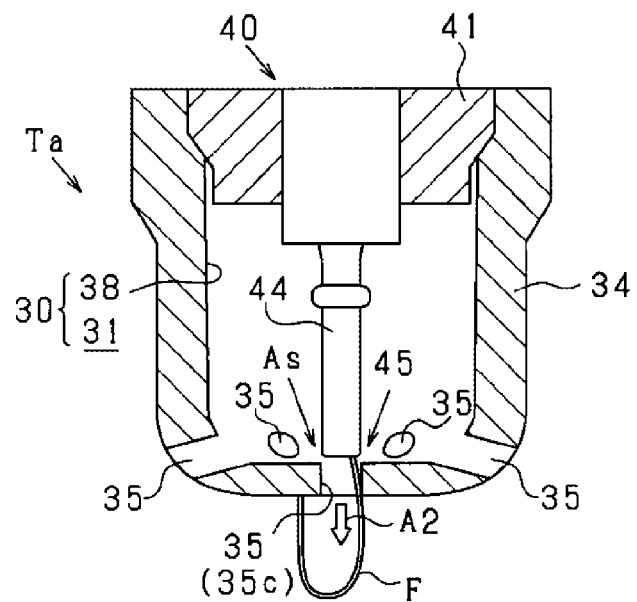
FIG. 6 is a cross-sectional view illustrating an auxiliary chamber and its surroundings at the time of ignition control after top dead center.

FIG. 6 is a cross-sectional view illustrating the auxiliary chamber 38 and its surroundings at the time of ignition control after top dead center during fast idling or the like. At the time of ignition control after top dead center, downward communication airflow A2 flowing from the auxiliary chamber 38 side to the main chamber 31 side flows through the discharge gap 45. Due to the communication airflow A2, the discharge spark F is extended from the inside of the auxiliary chamber 38 through the central communication hole 35c to the inside of the main chamber 31. Due to the discharge spark F, the ignition plug 40 ignites fuel in the main chamber 31.

According to the present embodiment, airflow at a flow rate Vaf of 10 to 240 m/s flows through the discharge gap 45 during the spark period after top dead center; thus, the airflow can extend the discharge spark F to improve ignitability. Accordingly, when ignition is performed with the discharge spark F after the compression top dead center Ta, ignitability due to the discharge spark F can be improved. Therefore, the catalyst can be warmed-up efficiently during fast idling. The details thereof will be described with reference to FIG. 7.

Figure 7:
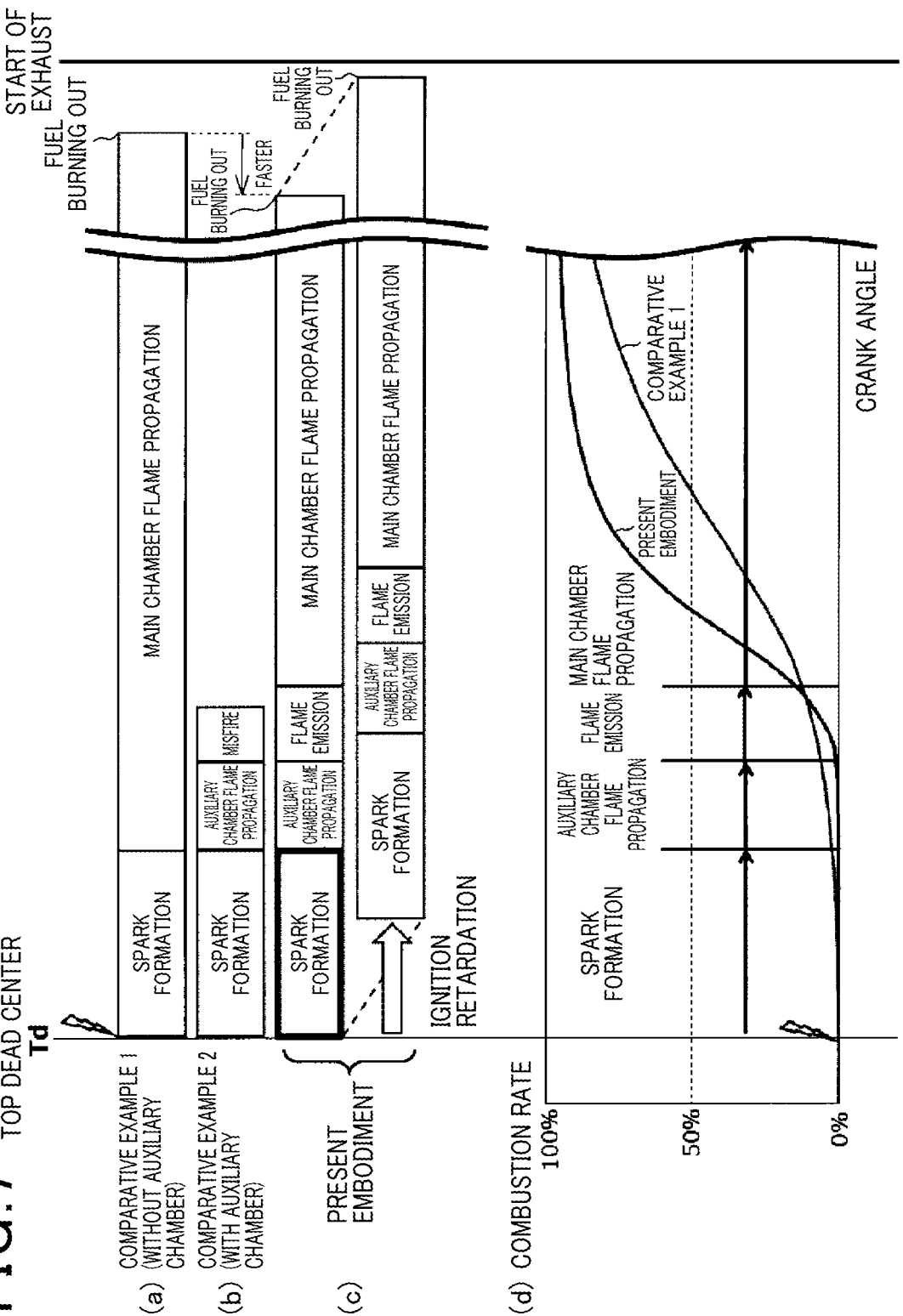
FIG. 7 is a graph illustrating combustion in comparative examples and the present embodiment.

FIG. 7(a) is the timing chart of Comparative Example 1 in which, unlike the present embodiment, the combustion chamber is not divided into a main chamber and an auxiliary chamber; that is, the entire combustion chamber is a main chamber. In the case of Comparative Example 1, ignition is performed in the main chamber, and the flame propagates as it is in the main chamber. However, due to the absence of an auxiliary chamber, no flame is emitted from the inside of the auxiliary chamber to the inside of the main chamber, and flame propagation is delayed in the main chamber compared with when there is an auxiliary chamber. As a result, the timing when the fuel is burned out, i.e., the end of the section of main chamber flame propagation shown in FIG. 7, is delayed. It is necessary that the timing when the fuel is burned out is faster than the start of exhaust. This is because the unburned fuel is prevented from being discharged. Due to this limitation, in Comparative Example 1, in which the timing when the fuel is burned out is delayed, the ignition timing cannot be set so much on the retarded side. Therefore, the catalyst cannot be warmed-up so efficiently in fast idling.

On the other hand, FIG. 7(b) is the timing chart of Comparative Example 2 in which the combustion chamber is divided into a main chamber and an auxiliary chamber, while there is no airflow support structure, unlike the present embodiment. In the case of Comparative Example 2, originally, a spark is formed in the auxiliary chamber, then the flame propagates into the auxiliary chamber, then the flame is emitted through the communication holes into the main chamber, and then the flame propagates into the main chamber. However, after the compression top dead center, the airflow weakens in the auxiliary chamber; thus, in the ignition control after top dead center, ignition and flame propagation in the auxiliary chamber become extremely poor, and there is a risk of misfire, as shown in FIG. 7(b).

In this respect, in the present embodiment shown in FIG. 7(c), due to the presence of the airflow support structure As, ignition and flame propagation in the auxiliary chamber 38 do not become extremely poor even in the ignition control after top dead center. Accordingly, there is no risk of misfire in the auxiliary chamber 38. Therefore, even in the ignition control after top dead center, a spark is formed in the auxiliary chamber 38 as it should be, then the flame propagates into the auxiliary chamber 38, then the flame is emitted from the communication holes 35 into the main chamber 31, and then the flame propagates into the main chamber 31. As a result, compared with Comparative Example 1 without an auxiliary chamber shown in FIG. 7(a), if the ignition timing is the same, the timing when the fuel is burned out, i.e., the end of the section of main chamber flame propagation shown in FIG. 7, gets faster, as shown in the upper diagram of FIG. 7(c).

FIG. 7(d) shows the details thereof. Thus, in the present embodiment with the auxiliary chamber 38, compared with Comparative Example 1 without an auxiliary chamber, due to flame emission from the auxiliary chamber 38, the rate of combustion in main chamber flame propagation increases faster, and the timing when the fuel burns out gets faster, as described above. As a result, as shown in the upper diagram of FIG. 7(c), there is time to spare from the timing when the fuel burns out to the start of exhaust. Therefore, under the constraint that the timing when the fuel burns out is faster than the start of exhaust, it is possible to set the ignition timing on the more retarded side, as shown in the lower diagram of FIG. 7(c). Therefore, the catalyst can be warmed-up efficiently in fast idling.

In addition, the following effects can also be obtained. The airflow support structure As can be easily formed by locating the central communication hole 35c close to the discharge gap 45. Moreover, the airflow support structure As increases the airflow flowing through the discharge gap 45 by the upward communication airflow A2 flowing from the main chamber 31 side to the auxiliary chamber 38 side before the compression top dead center Tb, and increases the airflow flowing through the discharge gap 45 by the downward communication airflow A2 flowing from the auxiliary chamber 38 side to the main chamber 31 side after the compression top dead center Ta. Therefore, at the time of either ignition control before top dead center or ignition control after top dead center, the airflow flowing through the discharge gap 45 can be increased during the generation period of the discharge spark F, thereby improving ignitability.

Moreover, since the flame is emitted from the communication holes 35 at the time of ignition control before top dead center, ignitability can also be improved in this respect. At this time, the following effect can also be obtained due to the presence of a plurality of communication holes 35. That is, flame emission from the central communication hole 35c for increasing the airflow flowing through the discharge gap 45 is weakened because the flame emission is disturbed by the center electrode 44 etc., as described above. In this respect, in the present embodiment, a plurality of communication holes 35 are provided, as described above, and the flame is more strongly emitted from the other communication holes 35 compared with the central communication hole 35c. Therefore, flame emission in the ignition control before top dead center can be mainly performed through the communication holes 35 other than the central communication hole 35c, and the airflow flowing through the discharge gap 45 in the ignition control after top dead center can be increased through the central communication hole 35c. As a result, flame emission in the ignition control before top dead center and airflow increase in the ignition control after top dead center can be both ensured sufficiently.

Furthermore, at the time of ignition control after top dead center, the discharge spark F is extended through the central communication hole 35c toward the inside of the main chamber 31, whereby ignition can be performed in the main chamber 31. Therefore, the flame can be quickly spread in the entire main chamber 31. Further, the central communication hole 35c is provided on the center line X of the cylinder 10, and at the time of ignition control after top dead center, the discharge spark F is extended downward along the center line X of the cylinder 10 through the central communication hole 35c. Therefore, ignition can be performed in the central part of the main chamber 31, and the flame can also be quickly spread in the entire main chamber 31 in this respect.

In addition, since the partition wall 34 also serves as the ground electrode of the ignition plug 40, the ignition plug 40 can have a simple configuration, and the discharge gap 45 can be efficiently located close to the central communication hole 35c.

Second Embodiment

Next, the second embodiment will be described. In the following embodiment, members and the like that are the same as or corresponding to those of the previous embodiment are designated by the same reference numerals. This embodiment will be described focusing on the differences from the first embodiment.

Figure 8:
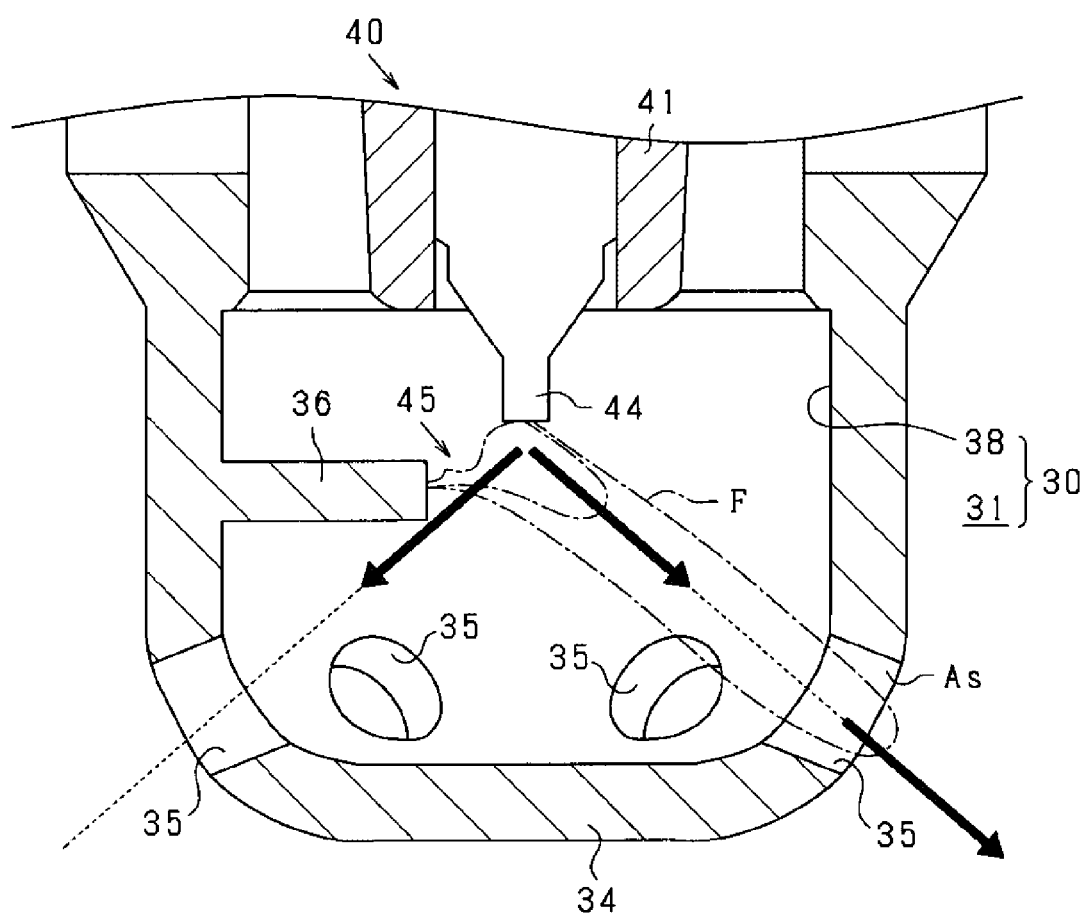
FIG. 8 is a cross-sectional view illustrating an auxiliary chamber and its surroundings in a second embodiment.

FIG. 8 is a cross-sectional view illustrating the auxiliary chamber 38 of the present embodiment and its surroundings. In the present embodiment, the partition wall 34 is also provided with a plurality of communication holes 35; however, the central communication hole 35c is not provided. The discharge gap 45 is provided at a position farther away from the communication holes 35 in the auxiliary chamber 38, compared with the first embodiment. Specifically, in the partition wall 34, a protrusion 36, which constitutes one electrode, is formed to protrude toward a center electrode 44, which is the other electrode. The discharge gap 45 is formed between the protrusion 36 and the center electrode 44. At the time of ignition control after top dead center, the airflow flowing from the inside of the auxiliary chamber 38 through a predetermined communication hole 35 into the main chamber 31 extends the discharge spark F toward the predetermined communication hole 35. The predetermined communication hole 35, i.e., the communication hole 35 that serves as the airflow support structure As to extend the discharge spark F, may be always the same communication hole 35, or may be a different communication hole 35 depending on the operating state of the engine 90.

The ignition control unit 50 controls the ignition plug 40 such that at the time of ignition control after top dead center, the discharge spark F is maintained for a period of time equal to or longer than a required period as the minimum required period for the discharge spark F to be extended to the predetermined communication hole 35 after the discharge spark F is generated. More preferably, the ignition control unit 50 controls the ignition plug 40 such that the discharge spark F is maintained for a period of time equal to or longer than a required period as the minimum required period for the discharge spark F to be extended into the main chamber 31 through the predetermined communication hole 35 after the discharge spark F is generated.

Such control of the ignition plug 40 can be executed, for example, by calculating the above required period based on the operating state of the engine 90, and controlling the ignition plug 40 such that the discharge spark F is maintained for a period of time equal to or longer than the calculated required period. Examples of the operating state include the rotational speed, load, intake amount, inner pressure, etc., of the engine 90. In addition to the above, such control of the ignition plug 40 can also be executed, for example, by controlling the ignition plug 40 such that during fast idling, the discharge spark F is maintained for a period of time that is never less than the above required period.

According to the present embodiment, at the time of ignition control after top dead center, the airflow flowing from the inside of the auxiliary chamber 38 through the above predetermined communication hole 35 into the main chamber 31 can extend the discharge spark F toward the predetermined communication hole 35, thereby improving ignitability. Therefore, even in the present embodiment, when ignition is performed with the discharge spark F after the compression top dead center Ta, ignitability due to the discharge spark F can be improved.

Further, when the required period is calculated based on the operating state of the engine 90, and the ignition plug 40 is controlled such that the discharge spark F is maintained for a period of time equal to or longer than the calculated required period, as described above, the required period can be changed, as appropriate, depending on the operating state of the engine 90, and the discharge period can be changed, as appropriate. Therefore, it becomes easy to control the discharge period to the optimum period without excess or deficiency.

Other Embodiments

The above embodiments can be carried out with the following changes. For example, in the first embodiment, the structure in which the discharge gap 45 is close to the central communication hole 35c is employed as the airflow support structure As; however, in place thereof or in addition thereto, a spray device for spraying air or a gas mixture to the discharge gap 45 during the spark period after top dead center may be provided as the airflow support structure As. Further, in this case, the partition wall 34 may be eliminated, and the main chamber 31 and the auxiliary chamber 38 may be integrated into a continuous combustion chamber 30.

Further, for example, in the first embodiment, fuel is injected into the intake pathway 21; however, in place thereof or in addition thereto, fuel or a gas mixture of fuel and air may be injected into the main chamber 31 or into the auxiliary chamber 38. Further, for example, in the first embodiment, the partition wall 34 is provided with a plurality of communication holes 35; however, the communication hole 35 may be a single central communication hole 35c alone. Further, for example, in the first embodiment, compared with the central communication hole 35c close to the discharge gap 45, the flame is more strongly emitted from the other communication holes 35; however, in place thereof, the flame may be most strongly emitted from the central communication hole 35c close to the discharge gap 45.

Further, for example, in the first embodiment, the partition wall 34 also serves as the ground electrode of the ignition plug 40; however, the ignition plug 40 may have another ground electrode separately from the partition wall 34. Then, the partition wall 34 may be provided on the outer side of the ground electrode, and as the airflow support structure As, the discharge gap 45 between the ground electrode and the center electrode 44 may be close to the communication hole 35.

Further, for example, in the first embodiment, airflow at a flow rate Vaf of 10 to 240 m/S flows through the discharge gap 45 during the spark period after top dead center; however, in place thereof, airflow at a flow rate Vaf of more than 240 m/s or airflow at a flow rate Vaf of less than 10 m/s may flow. However, even in this case, it is preferable that airflow at a flow rate Vaf of 5 m/s or more flows through the discharge gap 45 during the spark period after top dead center. This is because without the airflow support structure As, it is difficult to allow airflow at a flow rate Vaf of 5 m/s or more to flow through the discharge gap 45 during the spark period after top dead center, and thus if the airflow at a flow rate Vaf of 5 m/s or more is enabled to flow, the effect of providing the airflow support structure As can be sufficiently exhibited.

Further, for example, in the first embodiment, the lower end of the center electrode 44 is located above the upper end of the central communication hole 35c, but may be located inside the central communication hole 35c or below the lower end of the central communication hole 35c. That is, in the first embodiment, the discharge gap 45 is provided in the immediate vicinity of the central communication hole 35c in the auxiliary chamber 38, but may be provided inside the central communication hole 35c or in the immediate vicinity of the central communication hole 35c in the main chamber 31.

Further, for example, in the first embodiment, the center electrode 44 is provided on the center line X of the cylinder 10, but may be provided at another position. Further, for example, in the first embodiment, the discharge gap 45 is close to the central communication hole 35c, but may be close to another communication hole 35.

Further, for example, in the first embodiment, the discharge spark F is extended downward at the time of ignition control after top dead center, but may be extended in other directions instead thereof. Specifically, it is preferable to configure the ignition system 70 such that the discharge spark F is extended, for example, in the direction of slow combustion progress, according to the specification of the engine 90. This can promote combustion where combustion progress is slow.

Further, for example, in the first embodiment, the engine 90 is a four-stroke engine; however, the engine 90 may be a two-stroke engine with one combustion cycle consisting of a compression stroke and an expansion stroke, in which both intake and exhaust are performed in the latter half of the expansion stroke and in the first half of the compression stroke.

The present disclosure is described according to embodiments; however, it is understood that the present disclosure is not limited to the embodiments and configurations. The present disclosure also includes various modified examples and modifications within an equivalent range. In addition, various combinations and configurations, and other combinations and configurations including more, less, or only a single element, are also within the spirit and scope of the present disclosure.

What is claimed is:

1. An ignition system comprising an ignition plug that applies a voltage to a discharge gap to generate a discharge spark to ignite fuel in a combustion chamber of an engine, and an ignition control unit that controls the ignition plug;
   the ignition control unit performing ignition control after top dead center to perform the ignition after the compression top dead center when the engine is in a predetermined operating state;
   wherein the combustion chamber is divided into a main chamber and an auxiliary chamber by a partition wall provided with a communication hole, so that airflow flows from the inside of the auxiliary chamber through the communication hole into the main chamber after the compression top dead center; and
   the discharge gap is disposed in the auxiliary chamber or in the communication hole, and at the time of the ignition control after top dead center, the discharge spark is extended by airflow through the communication hole into the main chamber.

2. The ignition system according to claim 1, wherein
   the ignition system has an airflow support structure that facilitates the flow of airflow through the discharge gap at least after the compression top dead center;
   the ignition system is configured such that due to the airflow support structure and the timing of the ignition, airflow at a flow rate of 5 m/s or more flows through the discharge gap during a spark period after top dead center, which is the generation period of the discharge spark in the ignition control after top dead center; and
   as the airflow support structure, the discharge gap is close to the communication hole such that the airflow at a flow rate of 5 m/s or more flows through the discharge gap during the spark period after top dead center.

3. The ignition system according to claim 2, wherein the partition wall is provided with a plurality of the communication holes; and
as the airflow support structure, the discharge gap is close to one predetermined communication hole among the plurality of communication holes such that the airflow at a flow rate of 5 m/s or more flows through the discharge gap during the spark period after top dead center.

4. The ignition system according to claim 3, wherein the ignition control unit performs ignition control before top dead center to perform the ignition before the compression top dead center when the engine is in an operating state other than the predetermined operating state; and
at least after ignition in the ignition control before top dead center, flame is emitted toward the inside of the main chamber from at least the communication holes other than the predetermined communication hole.

5. The ignition system according to claim 4, wherein compared with the predetermined communication hole, the flame is more strongly emitted from the communication holes other than the predetermined communication hole.

6. The ignition system according to claim 1, wherein the discharge gap is provided in the auxiliary chamber; and
at the time of the ignition control after top dead center, the discharge spark is extended toward the predetermined communication hole by airflow flowing from the inside of the auxiliary chamber through the predetermined communication hole into the main chamber.

7. The ignition system according to claim 6, wherein the ignition control unit controls the ignition plug such that the discharge spark is maintained for a period of time equal to or longer than a required period as a minimum required period for the discharge spark to be extended into the main chamber through the predetermined communication hole after the discharge spark is generated at the time of the ignition control after top dead center.

8. The ignition system according to claim 7, wherein the ignition control unit calculates the required period based on the operating state of the engine, and controls the ignition plug such that the discharge spark is maintained for a period of time equal to or longer than the calculated required period.

9. The ignition system according to claim 1, wherein the combustion chamber is formed in a cylinder;
the communication hole is provided on the center line of the cylinder; and
at the time of the ignition control after top dead center, the discharge spark is extended in the length direction of the center line through the communication hole on the center line.

10. The ignition system according to claim 1, wherein the discharge gap is formed between two electrodes, and the partition wall also serves as one electrode out of the two electrodes.

11. The ignition system according to claim 1, wherein the discharge gap is formed between two electrodes, and in the partition wall, a protrusion, which constitutes one of the electrodes, is formed to protrude toward the other electrode.

12. An ignition system comprising an ignition plug that applies a voltage to a discharge gap to generate a discharge spark to ignite fuel in a combustion chamber of an engine, and an ignition control unit that controls the ignition plug;
the ignition control unit performing ignition control after top dead center to perform the ignition after the compression top dead center when the engine is in a predetermined operating state;
the combustion chamber being divided into a main chamber and an auxiliary chamber by a partition wall provided with a plurality of communication holes, so that airflow flows from the inside of the auxiliary chamber through the communication holes into the main chamber after the compression top dead center;
the discharge gap being disposed in the auxiliary chamber or in a predetermined communication hole among the plurality of communication holes while being closest to the predetermined communication hole; and
at the time of the ignition control after top dead center, the discharge spark is extended by airflow through the predetermined communication hole into the main chamber.

13. The ignition system according to claim 12, wherein the ignition control unit performs ignition control before top dead center to perform the ignition before the compression top dead center when the engine is in an operating state other than the predetermined operating state; and
at least after ignition in the ignition control before top dead center, flame is emitted toward the inside of the main chamber from at least the communication holes other than the predetermined communication hole.

14. The ignition system according to claim 13, wherein compared with the predetermined communication hole, the flame is more strongly emitted from the communication holes other than the predetermined communication hole.

15. The ignition system according to claim 12, wherein the discharge gap is provided in the auxiliary chamber; and
at the time of the ignition control after top dead center, the discharge spark is extended toward the predetermined communication hole by airflow flowing from the inside of the auxiliary chamber through the predetermined communication hole into the main chamber.

16. The ignition system according to claim 15, wherein the ignition control unit controls the ignition plug such that the discharge spark is maintained for a period of time equal to or longer than a required period as a minimum required period for the discharge spark to be extended into the main chamber through the predetermined communication hole after the discharge spark is generated at the time of the ignition control after top dead center.

17. The ignition system according to claim 16, wherein the ignition control unit calculates the required period based on the operating state of the engine, and controls the ignition plug such that the discharge spark is maintained for a period of time equal to or longer than the calculated required period.

18. The ignition system according to claim 12, wherein the combustion chamber is formed in a cylinder;
the communication hole is provided on the center line of the cylinder; and
at the time of the ignition control after top dead center, the discharge spark is extended in the length direction of the center line through the communication hole on the center line.

19. The ignition system according to claim 12, wherein the discharge gap is formed between two electrodes, and the partition wall also serves as one electrode out of the two electrodes.

20. The ignition system according to claim 12, wherein the discharge gap is formed between two electrodes, and in the partition wall, a protrusion, which constitutes one of the electrodes, is formed to protrude toward the other electrode.

21. An ignition system comprising an ignition plug that applies a voltage to a discharge gap to generate a discharge spark to ignite fuel in a combustion chamber of an engine, and an ignition control unit that controls the ignition plug;

the ignition control unit performing ignition control after top dead center to perform the ignition after the compression top dead center when the engine is in a predetermined operating state;

the combustion chamber being divided into a main chamber and an auxiliary chamber by a partition wall provided with one or a plurality of communication holes, so that airflow flows from the inside of the auxiliary chamber through a predetermined communication hole among the one or a plurality of communication holes into the main chamber after the compression top dead center;

the discharge gap being provided in the auxiliary chamber; and at the time of the ignition control after top dead center, the discharge spark is extended toward the predetermined communication hole by airflow flowing from the inside of the auxiliary chamber through the predetermined communication hole into the main chamber; and the ignition control unit controls the ignition plug such that the discharge spark is maintained for a period of time equal to or longer than a required period as a minimum required period for the discharge spark to be extended into the main chamber through the predetermined communication hole after the discharge spark is generated at the time of the ignition control after top dead center.

22. The ignition system according to claim 21, wherein the combustion chamber is formed in a cylinder;

the communication hole is provided on the center line of the cylinder; and at the time of the ignition control after top dead center, the discharge spark is extended in the length direction of the center line through the communication hole on the center line.

23. The ignition system according to claim 21, wherein the discharge gap is formed between two electrodes, and the partition wall also serves as one electrode out of the two electrodes.

24. The ignition system according to claim 21, wherein the discharge gap is formed between two electrodes, and in the partition wall, a protrusion, which constitutes one of the electrodes, is formed to protrude toward the other electrode.

* * * * *